Patented May 6, 1952

2,595,410

UNITED STATES PATENT OFFICE 2,595,410

MODIFIED CELLULOSE ESTERS

George A. Richter, Jr., Springfield, Pa., assignor to American Viscose Corporation, Wilmington, Del., a corporation of Delaware No Drawing. Application February 26, 1949, Serial No. 78,671

7 Claims. (Cl. 18—54)

This invention relates to modified cellulose and cellulose esters, and to methods of making the same.

The cellulose esters have the advantage that they are soluble in organic solvents and can be readily formed into shaped articles by spinning or casting solutions thereof in the organic solvents into an evaporative atmosphere. This solubility of the esters in organic solvents is also a disadvantage because articles formed therefrom cannot be brought into contact with the solvents in later use without damage. Another disadvantage of the organic solvent-soluble cellulose esters is that they fuse at temperatures which are entirely safe for other materials, such as viscose rayon, silk, etc., and require special ironing conditions for structures fabricated therefrom to prevent fusing and sticking of the fabric to the iron.

The need for cellulose esters having modified solubility in organic solvents and increased softening temperatures has existed for a long time, but has not been filled because, although it has been attempted to modify the properties of the esters, any improvement previously observable in the solubility and fusibility characteristics has been at the expense of extensibility of the modified ester, which was considerably less than the extensibility of the unmodified esters.

Several methods for reducing the solubility of the cellulose esters in organic solvents and raising the fusing temperature by chemical modification have been suggested. One such method involves surface treatment of fabricated structures comprising the cellulose esters. Such surface treatments are undesirable and have not been found satisfactory. Another method involved the addition of various modifying agents to spinning solutions of the esters. Invariably, in the past, the modifying agents suggested for addition to the cellulose ester solutions have been such that in order to complete the reaction between the ester and modifying agents, it has been necessary to subject articles formed from the solution to high temperatures approaching the discoloration temperature for the ester for relatively long periods, and the esters lose extensibility. Furthermore, the modifying agents previously suggested for addition to the cellulose ester solutions have been comparatively unavailable and therefore prohibitively expensive materials.

One object of the present invention is to provide an economically practical method for modifying the solubility and fusibility of cellulose esters without substantial loss of extensibility as compared to the extensibility of unmodified cellulose esters. Another object is to produce cellulose having modified properties by saponification or hydrolysis of the modified cellulose esters.

In accordance with this invention, aldehydes which do not contain a hydrocarbon radical, i. e., formaldehyde or glyoxal, and an acid-reacting catalyst are added to a solution of a cellulose ester having free hydroxyl groups, in an organic solvent, and thereafter the solution is shaped to the desired form and the cellulose ester and aldehyde are reacted under conditions such that the reaction is brought to completion simultaneously with evaporation of the organic solvent and before equilibrium is established.

The articles thus obtained are insoluble in organic solvents and are resistant to fusing at high temperatures. Not only are the properties of the esters modified in these respects, but I have found, unexpectedly, that the modified cellulose esters have extensibilities substantially the same as the extensibilities of the unmodified organic solvent-soluble-cellulose esters.

By the addition of the modifying agent and catalyst to the ester solution prior to spinning or casting thereof into an evaporative atmosphere, it is assured that the aldehyde and catalyst are present under conditions most favorable for reaction of the modifying agent with the free hydroxyls on different cellulose chains and the formation of acetal-type cross-links between the chains, that is, when the esters are in optimum swollen condition and the distance between the chains, which decreases with evaporation of the organic solvent and consequent increase in relative concentration of the formaldehyde or glyoxal, permits cross-linking of the different chains, and such cross-linking appears to be effected. However, the introduction of cross-links between cellulose chains, usually results in a three-dimensional structure having increased rigidity and decreased extensibility.

Without commitment to any particular theoretical explanation of the reasons for the desirable results obtained when the properties of the esters are modified by the addition of formaldehyde or glyoxal and an acid-reacting catalyst to the ester solution, and completion of the reaction between the ester and modifying agent simultaneously with evaporation of the solvent, in accordance with this invention, it appears that under the conditions described, modification of the solubility of the ester, and raising of the softening temperature, are effected as a result of the formation of acetal-type cross-links which are, however, relatively few in number and comparatively widely spaced along the cellulose chains and do not appreciably effect the extensibility of the ester. The fact that the reaction is effected without subjecting the articles formed from the solution to extremely high temperatures for long periods, after evaporation of the solvent, also appears to be important. I have found that when reaction between the cellulose ester and formaldehyde or glyoxal is brought to completion while evaporating off the organic solvent at a relatively slow rate, the loss in extensibility of the esters is less than occurs when evaporation is hastened by means of higher temperatures, and even when subjecting the fibers to a temperature of about 100° C. for a half-hour, which conditions are much less drastic than those required in the case of previously suggested modifying agents. A further factor is that the modification of the esters, without substantial loss in extensibility, is effected by the addition of relatively small amounts of formaldehyde or glyoxal to the spinning or casting solutions, that is, in amounts not in excess of about 10%, based on the weight of the ester present in the solution. Preferably, the formaldehyde or glyoxal is added to the solution in an amount of from about 2 to 10%

When proceeding in accordance with this invention, the cellulose ester solution containing formaldehyde or glyoxal, and an acid-reacting catalyst, is extruded into an evaporative atmosphere, in accordance with usual dry spinning technique. The temperature of the evaporative atmosphere is such that the reaction between the ester and modifying agent is initiated simultaneously with evaporation of the solvent and shaping of the ester to the desired form. The reaction may be brought to completion while the article is maintained in such evaporative atmosphere, which may be accomplished in the case of fibers, for instance, by extending the length of the dry spinning cell. However, it is preferred to initiate the reaction and partially evaporate the solvent in the cell, and then subject the fibers to the usual stretching step, and collect the stretched fibers on a revolving drum, spool or the like. The fibers, after stretching and collection, retain an appreciable quantity of the organic solvent so that the reaction may be brought to completion, after stretching of the fibers but before all of the solvent has been evaporated, that is, before equilibrium with atmospheric moisture has been established. As previously indicated, evaporation of the solvent and completion of the reaction between the ester and modifying agent may be hastened by subjecting the fibers to air at a temperature of about 100° C. for from ten minutes to about one-half hour, but since some loss in extensibility is noted even when using such comparatively low temperatures, it is preferred to evaporate the residual solvent and complete the reaction by exposing the fibers to the atmosphere at room temperatures for about 24 hours or less.

The invention has the further advantage that the water which occurs as by-product during the reaction is quickly carried off by the evaporating solvent and does not remain in contact with the cellulose esters, thus avoiding the possibility of undesired hydrolysis of the ester groups.

The formaldehyde or glyoxal and acid-reacting catalyst may be added to solutions of any organic solvent-soluble cellulose ester or mixed cellulose ester having at least one unsubstituted hydroxyl group. Where the ester is soluble in acetone, that solvent is preferred, but in the case of acetone-insoluble esters, other suitable solvents may be utilized. The solvent selected for use with any particular cellulose ester is also a solvent for formaldehyde or glyoxal.

The use of an acid-reacting catalyst is essential. Such catalyst may be a substance which is acid in reaction or capable of becoming acid or of liberating an acid under the conditions of the process. As examples of suitable catalysts there may be mentioned organic carboxylic or sulfonic acids, such as oxalic acid, tartaric acid and benzenesulfonic acid, acid salts of organic acids such as sodium acid tartrate, and potassium textroxalate, mineral acids, such as hydrochloric acid, sulfuric acid and phosphoric acid, as well as acid salts of mineral acids such as sodium bisulfate and dihydrogen sodium phosphate. The catalyst may be used in amounts ranging from about 0.1% to about 6%, based on the weight of the ester.

As indicated heretofore, the invention not only has the advantage that modification of the solubility and fusibility of the cellulose esters is achieved by means of readily available and inexpensive materials, but has the additional highly important advantage that the modification is achieved without any appreciable loss in extensibility of the esters. Fibers or other articles obtained in accordance with the invention are insoluble in the common organic solvents, have increased softening temperatures, and extensibilities substantially the same as those of articles from the unmodified cellulose esters. For example, when formaldehyde and an acid-reacting catalyst are added to a solution of secondary cellulose acetate in acetone, the cellulose acetate, which is normally soluble in acetone and softens or fuses at temperatures of about 240° C. or below, is changed after reaction of the ester with the modifying agent simultaneously with evaporation of the solvent therefrom so that it is thereafter insoluble in acetone and does not soften or fuse at temperatures of less than about 258° C. or higher. Fibers obtained from the solutions containing formaldehyde after stretching and finishing, have extensibilities of from about 20 to 30% which compares very favorably with the extensibilities of from 23 to 30% of conventional cellulose acetate fibers.

The following examples will serve to illustrate specific embodiments of the invention:

*Example I*

About 8% of formaldehyde and 2% of oxalic acid were added to a spinning solution consisting of a 25% solution of secondary cellulose acetate (54.5% combined acetic acid) in acetone. The solution was extruded into a dry spinning cell in the usual manner, and the resultant fibers were stretched, finished and collected on spools which were then exposed to the atmosphere at room temperature for about 24 hours. The fibers were washed to remove the acid-reacting catalyst. The final fibers were insoluble in acetone, had a softening temperature of about 258° C. and an extensibility of about 22.6%.

*Example II*

About 8% of formaldehyde and 6% of oxalic acid were added to a spinning solution consisting of a 25% solution of secondary cellulose acetate (54.5% combined acetic acid) in acetone. The solution was extruded into a dry spinning cell in accordance with conventional dry spinning technique and after stretching the fibers thus obtained were collected on spools, the spools were placed in an oven at 100° C. for about one-half hour. The final fibers, after washing thereof to remove the acid-reacting catalyst, were insoluble in organic solvents, did not soften or fuse below 258° C. and had an extensibility of about 20%.

Cellulose esters modified by reaction with formaldehyde or glyoxal in the presence of an acid-reacting catalyst simultaneously with evaporation of the organic solvent therefrom as described herein are useful for the same purpose as the organic solvent-soluble esters, but are also useful for purposes and under conditions for which the conventional cellulose esters are not suited. Thus articles formed from the modified esters may be exposed to organic solvents, accidentally or intentionally, without being damaged and fabrics formed therefrom may be ironed at higher temperatures without discoloration, softening or fusing of the esters.

The acetal-type linkages which are uniformly distributed throughout the cellulose ester mass are stable towards alkaline or acid hydrolysis. The modified esters produced as described may be saponified, for example, by treatment with aqueous alkaline solutions, such as solutions of sodium hydroxide or potassium hydroxide, or solutions in which the sodium or potassium hydroxide is replaced, in whole or in part, by alkaline salts such as the carbonate of sodium or potassium, or the sulfide of sodium or potassium, without destruction of the linkages or change in the modified properties, and, also, the ester groups may be hydrolyzed in acid medium without destruction of the acetal linkages. The invention therefore also provides a homogeneous cellulose having properties which are different from those of conventional regenerated cellulose, such as resistance to dimensional change or swelling in the presence of water or aqueous media, insolubility in cupraammonium solution, improved resistance to wrinkling, etc., which properties are uniform at all portions of the cellulose mass.

Variations may be made in carrying out the invention without departing from the spirit thereof and the invention is not to be limited except as defined by the appended claims.

I claim:

1. The method of manufacturing shaped articles comprising cellulose acetate characterized by modified solubility in organic solvents and increased softening temperatures which comprises admixing from 2 to 10%, based on the weight of the cellulose acetate, of an aldehyde selected from the group consisting of formaldehyde and glyoxal and from 0.1 to 6%, based on the weight of the cellulose acetate, of an acid-reacting catalyst with a solution of secondary cellulose acetate in acetone, forming the solution into an article of predetermined shape while simultaneously initiating evaporation of the acetone therefrom and chemical reaction between the cellulose acetate and aldehyde, and thereafter simultaneously removing residual acetone from the formed article and completing reaction between the cellulose acetate and aldehyde by exposing the article to air at a temperature not greater than 100° C.

2. The method of manufacturing shaped articles comprising cellulose acetate characterized by modified solubility in organic solvents and increased softening temperatures, which comprises admixing from 2 to 10%, based on the weight of the cellulose acetate, of formaldehyde and from 0.1 to 6%, based on the weight of the cellulose acetate of an acid-reacting catalyst with a solution of secondary cellulose acetate in acetone, forming the solution into an article of predetermined shape while simultaneously initiating evaporation of the acetone therefrom and chemical reaction between the cellulose acetate and aldehyde, and thereafter simultaneously removing residual acetone from the formed article and completing reaction between the cellulose acetate and aldehyde by exposing the article to air at a temperature not greater than 100° C.

3. The method of manufacturing shaped articles comprising cellulose acetate characterized by modified solubility in organic solvents and increased softening temperatures, which comprises admixing from 2 to 10%, based on the weight of the cellulose acetate, of glyoxal and from 0.1 to 6%, based on the weight of the cellulose acetate, of an acid-reacting catalyst with a solution of secondary cellulose acetate in acetone, forming the solution into an article of predetermined shape while simultaneously initiating evaporation of the acetone therefrom and chemical reaction between the cellulose acetate and aldehyde, and thereafter simultaneously removing residual acetone from the formed article and completing reaction between the cellulose acetate and aldehyde by exposing the article to air at a temperature not greater than 100° C.

4. The method of manufacturing shaped articles comprising cellulose acetate characterized by modified solubility in organic solvents and increased softening temperatures, which comprises admixing from 2 to 10%, based on the weight of the cellulose acetate, of formaldehyde and from 0.1 to 6%, based on the weight of the cellulose acetate, of an acid-reacting catalyst with a spinning solution comprising secondary cellulose acetate in acetone, forming the solution into an article of predetermined shape while simultaneously initiating evaporation of the acetone therefrom and chemical reaction between the cellulose acetate and formaldehyde, and thereafter simultaneously removing residual solvent from the formed article and completing reaction between the cellulose acetate and formaldehyde by exposing the article to air at a temperature not greater than 100° C.

5. The method of manufacturing fibers comprising cellulose acetate characterized by modified solubility in organic solvents and increased softening temperatures, which comprises admixing from 2 to 10%, based on the weight of the cellulose acetate, of an aldehyde selected from the group consisting of formaldehyde and glyoxal and from 0.1 to 6%, based on the weight of the cellulose acetate, of an acid-reacting catalyst with a spinning solution comprising secondary cellulose acetate in acetone, spinning the solution into an evaporative atmosphere to simultaneously initiate evaporation of the acetone and chemical reaction between the cellulose acetate and aldehyde, stretching the resulting fibers, and exposing the fibers to air at a temperature not greater than 100° C. to simultaneously effect evaporation of residual solvent and completion of the reaction between the cellulose acetate and aldehyde.

6. The method of manufacturing fibers comprising cellulose acetate characterized by modified solubility in organic solvents and increased softening temperatures, which comprises admixing from 2 to 10%, based on the weight of the cellulose acetate, of formaldehyde and from 0.1 to 6% based on the weight of the cellulose acetate, of an acid-reacting catalyst with a spinning solution comprising secondary cellulose acetate in acetone, spinning the solution into an evaporative atmosphere to simultaneously initiate evaporation of the acetone and chemical reaction between the cellulose acetate and formaldehyde, stretching the resulting fibers, and exposing the fibers to air at a temperature not greater than 100° C. to simultaneously effect evaporation of residual solvent and completion of the reaction between the cellulose acetate and formaldehyde.

7. The method of manufacturing fibers comprising cellulose acetate characterized by modified solubility in organic solvents and increased softening temperatures, which comprises admixing from 2 to 10%, based on the weight of the cellulose acetate of glyoxal and from 0.1 to 6%, based on the weight of the cellulose acetate, of an acid-reacting catalyst with a spinning solution comprising secondary cellulose acetate in acetone, spinning the solution into an evaporative atmosphere to simultaneously initiate evaporation of the acetone and chemical reaction between the cellulose acetate and glyoxal, stretching the resulting fibers, and exposing the fibers to air at a temperature not greater than 100° C. to simultaneously effect evaporation of residual solvent and completion of the reaction between the cellulose acetate and glyoxal.

GEORGE A. RICHTER, Jr.

REFERENCES CITED

The following references are of record in the file of this patent:

UNITED STATES PATENTS

| Number | Name | Date |
|---|---|---|
| 1,528,810 | Zdanowich | Mar. 10, 1925 |
| 2,311,080 | Pinkney | Feb. 16, 1943 |

FOREIGN PATENTS

| Number | Country | Date |
|---|---|---|
| 209,125 | Great Britain | Jan. 7, 1924 |